United States Patent [19]

Haferkamp et al.

[11] 4,183,784
[45] Jan. 15, 1980

[54] NUCLEAR REACTOR PLANT WITH CLOSED GAS COOLANT CIRCUIT

[75] Inventors: Dirk Haferkamp; Alija Hodzic, both of Mannheim, Fed. Rep. of Germany; Paul Moser, Dietlikon, Switzerland; Dieter Prasch, Frankental, Fed. Rep. of Germany

[73] Assignees: Hochtemperatur-Reaktorbau GmbH, Cologne, Fed. Rep. of Germany, BBC Aktiengesellschaft Brown, Bovery & Cie., Baden, Switzerland

[21] Appl. No.: 825,545

[22] Filed: Aug. 16, 1977

[30] Foreign Application Priority Data

Aug. 18, 1976 [DE] Fed. Rep. of Germany ....... 2637166

[51] Int. Cl.² .............................................. G21C 19/28
[52] U.S. Cl. ..................................................... 176/60
[58] Field of Search ..................................... 176/58–60, 176/65, 87; 285/302

[56] References Cited

U.S. PATENT DOCUMENTS

| | | | |
|---|---|---|---|
| 3,639,566 | 4/1972 | Coast et al. | 176/60 |
| 3,929,188 | 12/1975 | Brinkmann et al. | 176/60 |
| 3,998,057 | 12/1976 | Haferkamp et al. | 176/60 |
| 4,025,387 | 5/1977 | Haferkamp et al. | 176/60 |
| 4,050,984 | 7/1977 | Arndt | 176/60 |

Primary Examiner—Samuel W. Engle
Assistant Examiner—S.A. Cangialosi
Attorney, Agent, or Firm—Schwartz, Jeffery, Schwaab, Mack, Blumenthal & Koch

[57] ABSTRACT

Disclosed is a nuclear reactor plant, comprising:
  a prestressed concrete pressure vessel;
  a high temperature reactor arranged in a central cavity within the vessel;
  a closed gas cooling circuit including at least one housed gas turbo unit arranged in a turbine duct in the wall of the vessel, said unit including a turbine and a compressor and having detachable bearings; means for exchanging heat and means for transporting gas in the cooling circuit including hot gas from the reactor to the turbine, said heat exchange means and said gas transport means being arranged in recesses in the wall of the vessel;
  means for forming a detachable plug-in type connection between the hot gas transport means and each turbo unit;
  means, positioned at the edge of the turbine duct, for connecting all remaining gas transport means to the turbo unit;
  means, including peripheral sealing members positioned between the inside wall of the turbine duct and the outer housing of the turbo unit, for separating each of the remaining gas transport means from each other;
  means for detachably connecting each turbo unit to the inside of its turbine duct;
  remote control means for detaching these connecting means;
  means, including at least one lifting device controllable from outside of the vessel through a bore in the wall of the vessel, for dismounting each turbo unit from within its turbine duct;
  means for detaching from outside of the vessel all connections to each turbo unit which must be removed in order for removal of the turbo unit from its turbine duct; and
  means, including a duct through the wall of said vessel, for gaining access to each bearing of each turbo unit.

13 Claims, 14 Drawing Figures

NUCLEAR REACTOR PLANT WITH CLOSED GAS COOLANT CIRCUIT

BACKGROUND OF THE INVENTION

The present invention pertains to a nuclear reactor plant with a prestressed concrete vessel, comprising a high temperature reactor with closed gas coolant circuit for the direct drive of at least one gas turbo apparatus comprising a turbine and a compressor, heat exchangers, and gas lines between the single circuit components. The high temperature reactor is arranged in a cavity, positioned in the center of the prestressed concrete vessel, the heat exchangers and the gas lines are installed in recesses in the wall of the prestressed concrete vessel, and each gas turbo apparatus is arranged in a turbine duct, led horizontally or vertically through the prestressed concrete vessel.

Such a plant, in which the nuclear reactor, gas turbo apparatus and the other associated circuit components are arranged in a common pressure vessel (integrated construction), has the advantage that only the mechanical or electrical power produced and the coolant which has not come in contact with the contaminated gas need be led out of the prestressed concrete vessel. Therefore, the space outside the concrete vessel is practically completely protected from contaminated gas and the space inside of the prestressed concrete vessel is optimally used. It can be very conducive to accomplishing the latter goal, if the heated working medium is not led to only one relatively large gas turbo apparatus, as it is provided in most of the nuclear reactors with closed gas coolant circuit, but if several smaller gas turbo units are arranged in the prestressed concrete vessel. These are coupled by the nuclear reactor and form in each case, together with the heat exchangers, an individual circuit for the utilization of heat (loop). Furthermore, special connection elements between the single parts of the plant which carry active gas are avoided by the integrated construction. This works out very favorably in the construction and operation of high temperature reactors. Therefore, the integrated construction is preferred in a great number of special nuclear power plants.

German Auslegeschrift No. 1,614,610 is stated as an example of a nuclear power plant having only one circuit for the utilization of heat. The concrete vessel, shown there, has two closed pressurized chambers, one which houses the reactor and the other which serves as a machine chamber. The working medium is led in lines, which penetrate the dividing wall between the both pressurized chambers, from the reactor to the turbine and from the compressor back again in an annular space below the reactor core. It is difficult to realize technically this so-called Igloo-type of construction, and the nuclear power plant does not work very economically, as a result of the arrangement principle.

Nuclear power plants of an integrated type of construction with several circuits for the utilization of heat (loops) are described in German Auslegeschriften (DAS) No. 1,764,355, and No. 1,806,471 and Offenlegungsschriften (DOS) No. 1,746,249, and No. 2,062,934. The three last-named patent applications disclose a nuclear power plant in which the turbine aggregates and the heat exchangers are arranged in parallel vertical bores in the pressure vessel wall and in which the single loops form groups symmetrically around the nuclear reactor, which is situated in a central cavity. Both in the wall of the pressure vessel as well as in the spaces between the circuit components, there are provided passages for the coolant. Each loop can be installed with all associated components in one and the same vertical bore (DAS No. 1,806,471) or the heat exchangers, turbines and compressors of each loop are in each case arranged in a separate bore. (DOS No. 1,764,249).

The above-mentioned DOS No. 1,764,355 discloses a nuclear power plant in which the circuit components of each loop are connected with each other by tubular channels. On the whole, two loops are provided. All heat exchangers are installed around the nuclear reactor in shaft-like recesses of the vessel wall, while both turbines and the associated compressor are arranged in one cavity below the nuclear reactor, in which there is also situated the gas distributing system for the heat exchangers. The turbines are arranged parallel to each other.

As already mentioned, the integrated type of construction does permit a good efficient usage of the prestressed concrete vessel, which moreover can be held relatively small in its measurements by an especially skillful arrangement of the individual circuit components. Thereby, a great role is played by the installation of the gas turbo unit or units if a plant with several loops is involved. As for all other circuit components, the demand is present also for the gas turbo units that they are readily accessible for inspection and maintenance and that they can be removed from the outside, in case of repairs.

SUMMARY OF THE INVENTION

Therefore, it is an object of the invention to provide an improved nuclear reactor plant of the type described above. It is also an object of the invention to provide such a plant wherein the accessibility and the detachability of the gas turbo units are ensured by the special arrangement and anchoring of each gas turbo unit in its respective turbine duct and by special elements connecting the turbine unit to the coolant circuit.

In accomplishing the foregoing objects, there has been provided in accordance with the present invention a nuclear reactor plant, comprising:

a prestressed concrete pressure vessel;

a high temperature reactor arranged in a first central cavity within the vessel;

a closed gas cooling circuit including at least one housed gas turbo unit arranged in a turbine duct in the wall of the vessel, said unit including a turbine and a compressor and having detachable bearings; means for exchanging heat and means for transporting gas in said cooling circuit including hot gas from the reactor to the turbine, said heat exchange means and said gas transport means being arranged in recesses in the wall of the vessel;

means for forming a detachable plug-in type connection between the hot gas transport means and each turbo unit;

means, positioned at the edge of the turbine duct, for connecting all remaining gas transport means to the turbo unit;

means, including peripheral sealing members positioned between the inside wall of the turbine duct and the outer housing of the turbo unit, for separating each of the remaining gas transport means from each other;

means for detachably connecting each turbo unit to the inside of its turbine duct;

remote control means for detaching these connecting means;

means, including at least one lifting device controllable from outside of the vessel through a bore in the wall of the vessel, for dismounting each turbo unit from within its turbine duct;

means for detaching from outside of the vessel all connections to each turbo unit which must be removed in order for removal of the turbo unit from its turbine duct; and means, including a duct through the wall of the vessel, for gaining access to each bearing of each turbo unit.

In a preferred embodiment, the plug-in type connection means comprises a hot gas conduit having a telescoping portion adjacent the turbine and means for operating the telescoping portion by remote control. Also, the closed gas cooling circuit preferably comprises a plurality of identical loops, each loop comprising a gas turbo unit, heat exchange means and gas transport means, and wherein the turbine ducts for each of these gas turbo units are arranged below the reactor cavity in a horizontal plane and are arranged symetrically, preferably radially to the vertical center axis of the vessel.

DETAILED DESCRIPTION OF PREFERRED EMBODIMENTS

Figure 1:
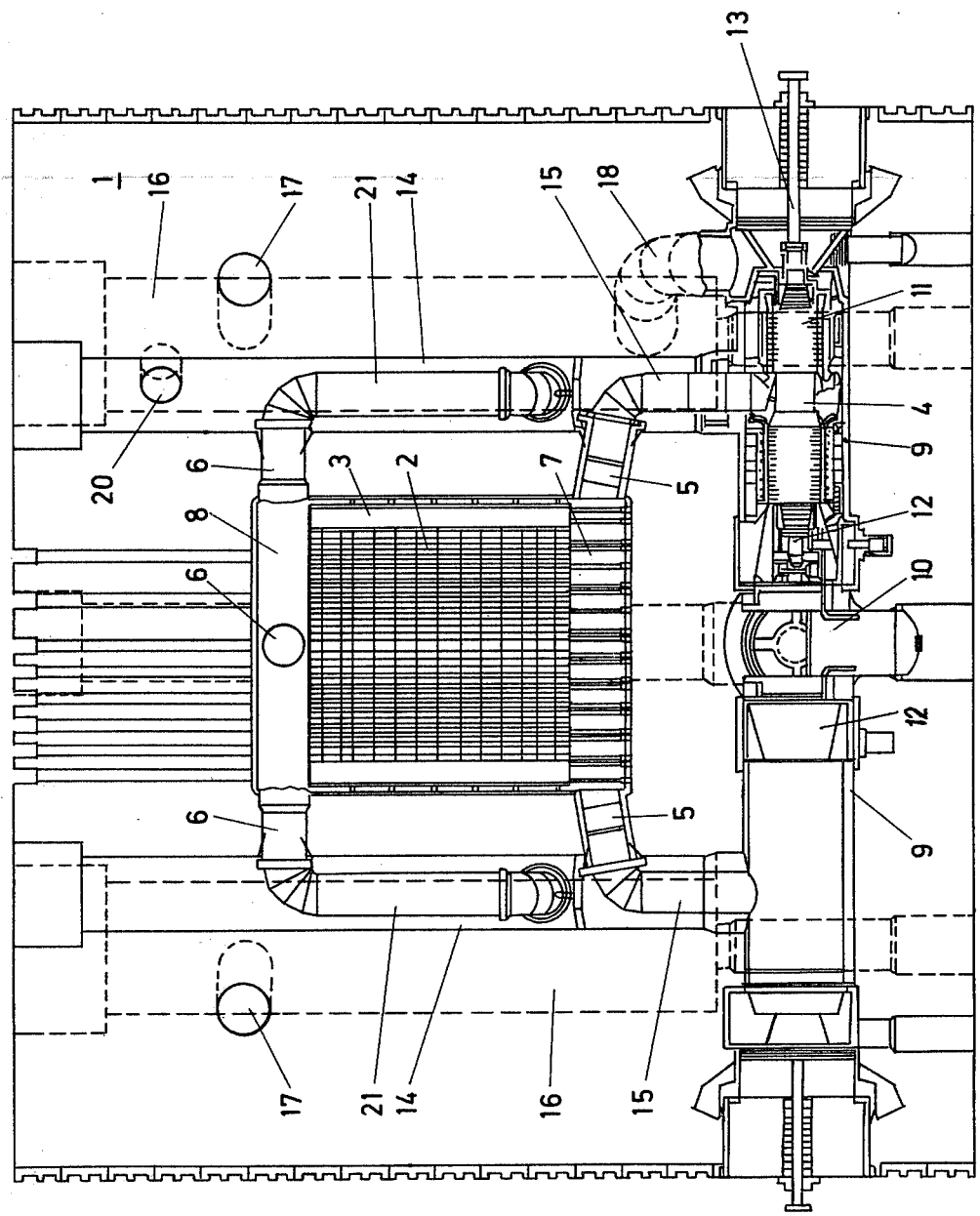
FIG. 1 is a vertical cross-sectional view taken through the total reactor plant according to the invention, which encompasses a circular section of 120°.

According to the present invention, the connection of the hot gas lines, coming from the high temperature reactor, to the inlet falnges of each gas turbo apparatus is designed as a plug-in type connection. The connections of the remaining gas lines belonging to each gas turbo apparatus are located at the turbine duct and are separated from each other by peripheral seals which lie between the duct wall and the housing of the gas turbo apparatus and which are designed as plug seals. All connections between a gas turbo apparatus and the associated turbine duct are designed as connections which are detachable from the outside by remote control. For dismounting each gas turbo apparatus by means of manipulators, there are provided lifting devices which are operable from the outside through manholes. All lines which are directly connected to each gas turbo unit and which must be separated from it before dismounting of the set are detachable and, respectively, are accessible from the outside through special manholes in the prestressed concrete vessel. All bearings belonging to a gas turbo set are detachably arranged in the turbine ducts and accessible from the outside through an access duct in the prestressed concrete vessel for inspections.

It is possible with a gas turbo apparatus installed according to the present invention to carry out the mounting and dismounting in a conventional manner, even though the gas turbo apparatus is arranged in a prestressed concrete vessel. The gas turbo set can be dismounted from the outside as a result of the connections between each gas turbo apparatus and the associated turbine duct which are detachable from the outside as well as with the aid of hydraulically operated manipulators acting on the lifting devices for the gas turbo unit. The anchoring of the gas turbo apparatus in the individual turbine ducts is effected, for example, by the aid of supports which transfer the basic pressure of the gas turbo apparatus to the prestressed concrete vessel. By means of hydraulic or mechanical instruments, the gas turbo apparatus can be detached from the anchoring from the outside. As far as necessary, all direct connections at the gas turbo apparatus (auxiliary systems, measuring points) are also detachable by remote control, and respectively, are arranged to be accessible from the outside of the prestressed concrete vessel.

With the exception of the hot gas line connections, which are designed as plug-in type connections, all gas line connections of the coolant circuit are located at the turbine ducts, i.e., a plug-in connection is provided only at the turbine inlet, whereby the necessary cost expenditure can be reduced essentially. The gas line connections are separated from each other by peripheral seals in the form of sliding rings which are partially constructed for high pressure and which are arranged between the housing of the gas turbo apparatus and the wall of the turbine duct. The parts of the peripheral seals provided at the wall of the turbine duct are designed as plug seals.

The housing of the gas turbo apparatus does not have flange connections. The metallic liners, with which the recesses serving for placement of heat exchangers and gas lines are usually coated, are flanged at the liner of the turbine duct, in those instances where recesses are in communication with the turbine duct.

The bearings existing in the turbine duct for the gas turbo apparatus can be inspected and detached without requiring that the gas turbo apparatus be detached previously. The access to the bearings is assured by special access ducts in the prestressed concrete vessel. Thus, also an extensive accessibility of the gas turbo apparatus from the outside is provided.

In order to facilitate the mounting and dismounting of the gas turbo apparatus, the hot gas lines are designed to be slidable in their lower part which faces toward the turbine inlet; i.e., with the aid of several lifting systems the lower parts can be telescopically inserted into the upper parts.

The course of the turbine duct in the prestressed concrete vessel is subjected in the main to no limitation; the duct can lead for example horizontally or vertically through the prestressed concrete vessel. In the case of a nuclear power plant with several identical loops, which are parallel connected and symmetrically arranged in the prestressed concrete vessel, it is advantageous to provide the turbine ducts (each taking up a gas turbo unit) below the reactor cavity in a horizontal plane and to arrange them symmetrical to the vertical center axis of the prestressed concrete vessel. For example, the turbine ducts in the horizontal plane can be arranged radially (star-shaped) whereby the center of the star is lying on the vertical center axis of the prestressed concrete vessel.

With an advantageous type of the nuclear reactor plant according to the invention, the turbine ducts are continued up to the vertical center axis of the prestressed concrete vessel. Each turbine duct is closed by a prestressed concrete plug. The turbine side of each gas turbo apparatus with the shaft connection for the associated generator is arranged toward the outlet of the turbine duct, while the compressor is arranged toward the center of the prestressed concrete vessel and is supported by an axial bearing, existing in the turbine duct. In a nuclear reactor plant with several loops, this bearing is located in the central area of the prestressed concrete vessel. The connection between the turbine and the generator is effected in each case by a shaft bore provided in the prestressed concrete plug. A further support for each gas turbo apparatus is provided at the prestressed concrete plug of the associated turbine duct, at which the gas turbo apparatus in addition has an axial fixed or anchor point.

All supply lines belonging to a gas turbo apparatus are provided in the apparatus itself and have connections at the external bearing ends. The lead out of the supply lines from the prestressed concrete vessel is effected by a central cavity, which is provided in the area of the joinder point of the radially (star-shaped) arranged turbine ducts, and by an access duct, closed by cover plates, which opens from the bottom in the central cavity. Through these ducts the central cavity is accessible, so that the supply lines can be separated from the respective gas turbo apparatus.

In order to relieve the housing of the gas turbo apparatus from the high pressure in the turbine duct, according to the invention all apparatus housings are subjected on the inside and outside to the same high pressure.

Each gas turbo apparatus can be inserted as a complete unit into the respective turbine duct. In order to facilitate the mounting and dismounting, in each turbine duct there are provided rails on which in each case roller chassis can be run. Each gas turbo apparatus is equipped with at least one such roller chassis and is inserted on this chassis into the respective turbine duct.

In the drawing, there is illustrated a nuclear reactor plant with three identical, symmetrically arranged and parallel connected loops as an example of an embodiment in which the gas turbo apparatus are radially (star-shaped) arranged and in which they are installed in turbine ducts, meeting in the vertical center axis of the prestressed concrete vessel.

FIG. 1 shows a cylindrical prestressed concrete vessel 1, in which a graphite-moderated, helium-cooled high temperature reactor 2 is installed in a cavity 3. The coolant circuit comprises three parallel connected circuits for utilization of heat (loops), which are coupled with the reactor 2. A gas turbo apparatus 4 consisting of a turbine and a compressor, as well as a recuperator and a cooler, belong to each loop.

The reactor 2 is connected with the three loops by three radial outlet flanges 5 and also by three radial inlet flanges 6. Below the floor of the reactor core, there is arranged a hot gas collecting chamber 7 for receiving heated gas leaving the core. Above the reactor core there is provided a cold gas collecting chamber 8, which receives the gas flowing back from the loops, before it is led again to the reactor core.

Vertically below the high temperature reactor 2, three horizontal ducts 9 are formed in the prestressed concrete vessel 1, which are arranged radially (star-shaped) and open into a cavity 10 at their joinder point in the center of the prestressed concrete vessel 1. In each of the ducts 9, there is installed a single-shaft gas turbine 11 as well as a compressor 12, which is situated together with the turbine 11 on a common shaft 13. Each turbine 11 is coupled with a generator (not shown).

Above each turbine 11 extends a vertical gas line pod 14 which is directly connected to the turbine duct 9. The three gas line pods 14 lie symmetrically on a circular line around the vertical center axis of the prestressed concrete vessel 1. In these pods three hot gas lines 15 are installed, each connecting one of the reactor outlet flanges 5 with one of the gas turbines 11.

Figure 3A:
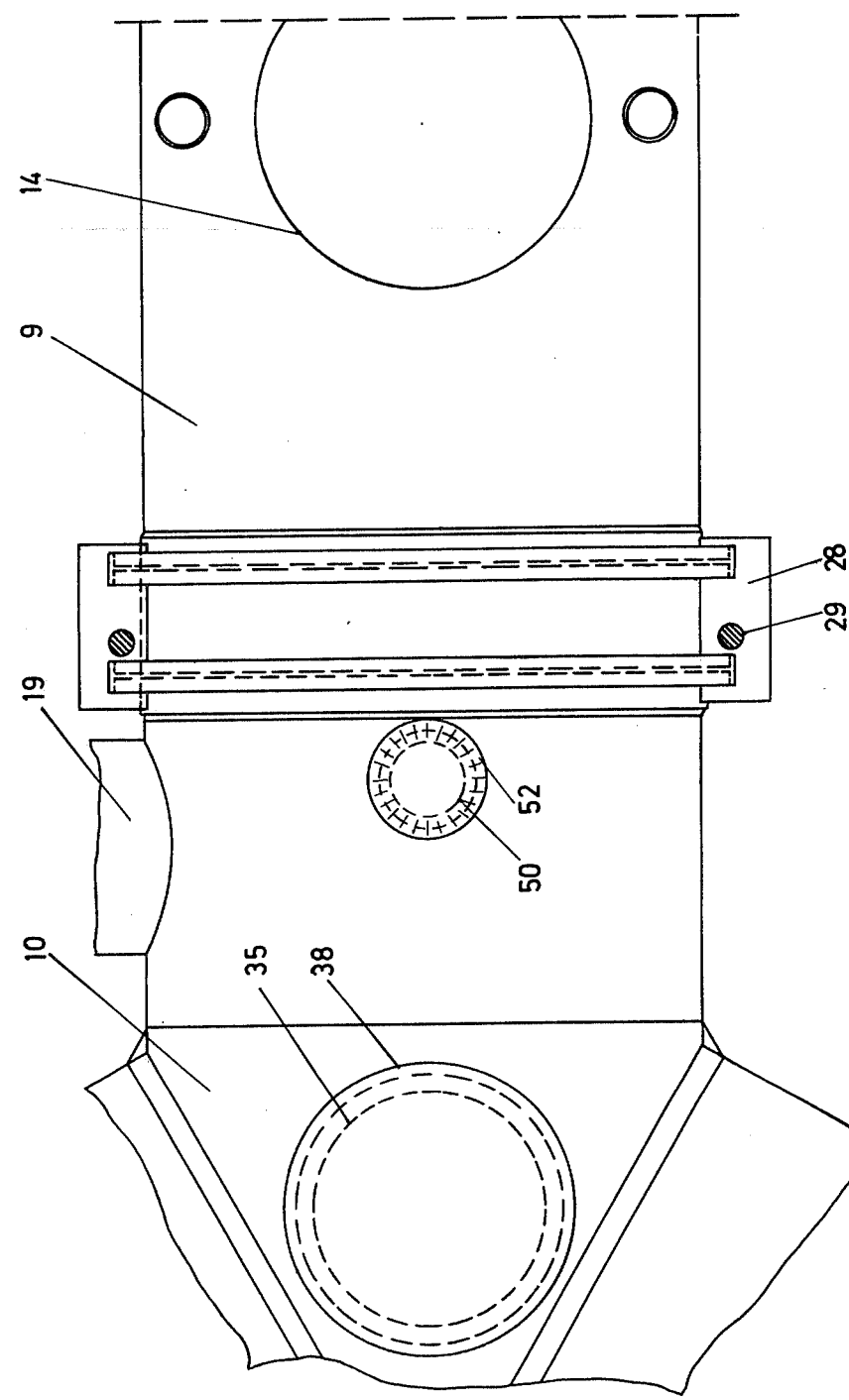
FIG. 3a and FIG. 3b are plan views of the part of the prestressed concrete vessel containing the turbine duct, seen from its bottom edge.
Figure 3B:
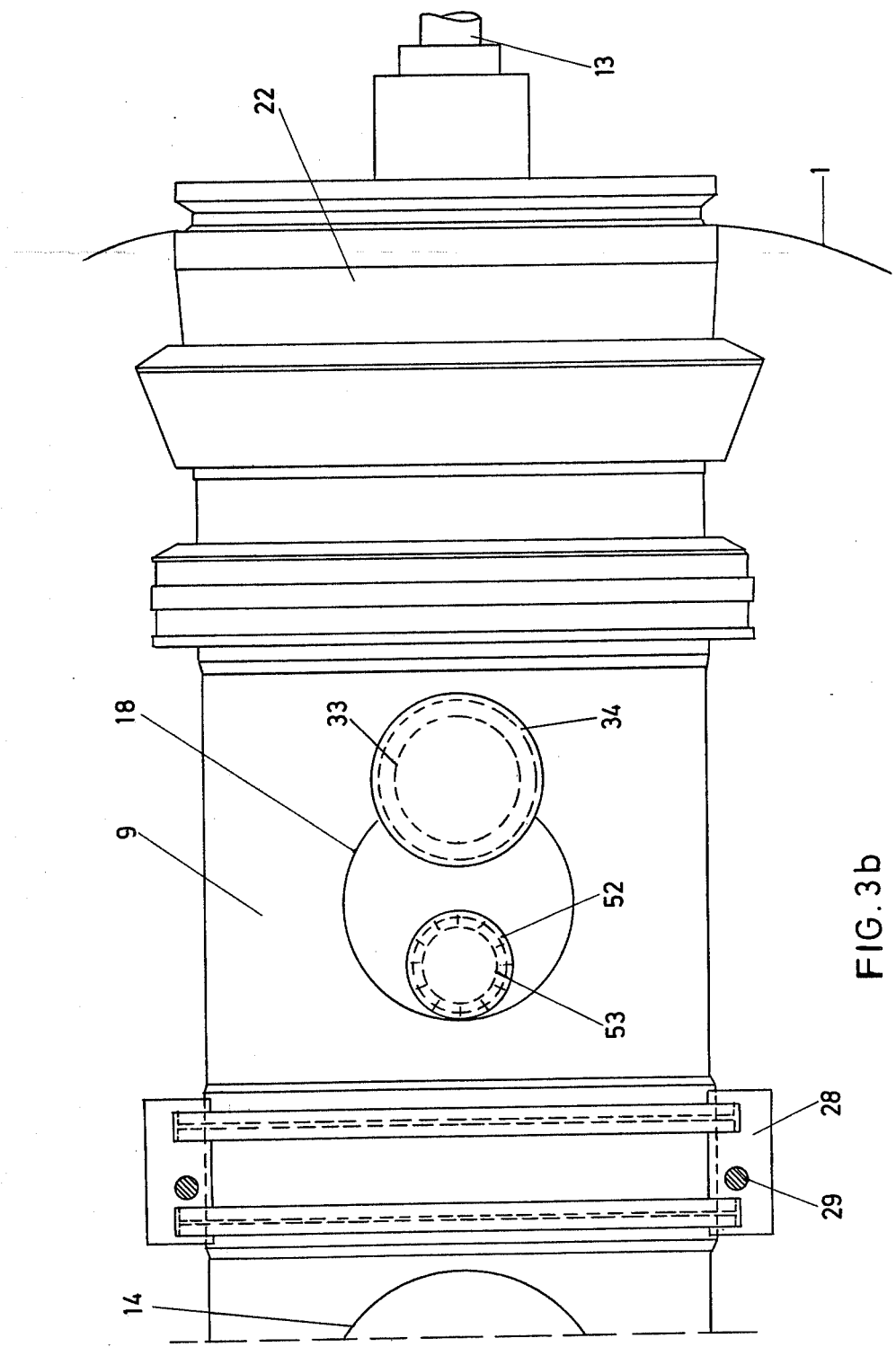
Figure 4A:
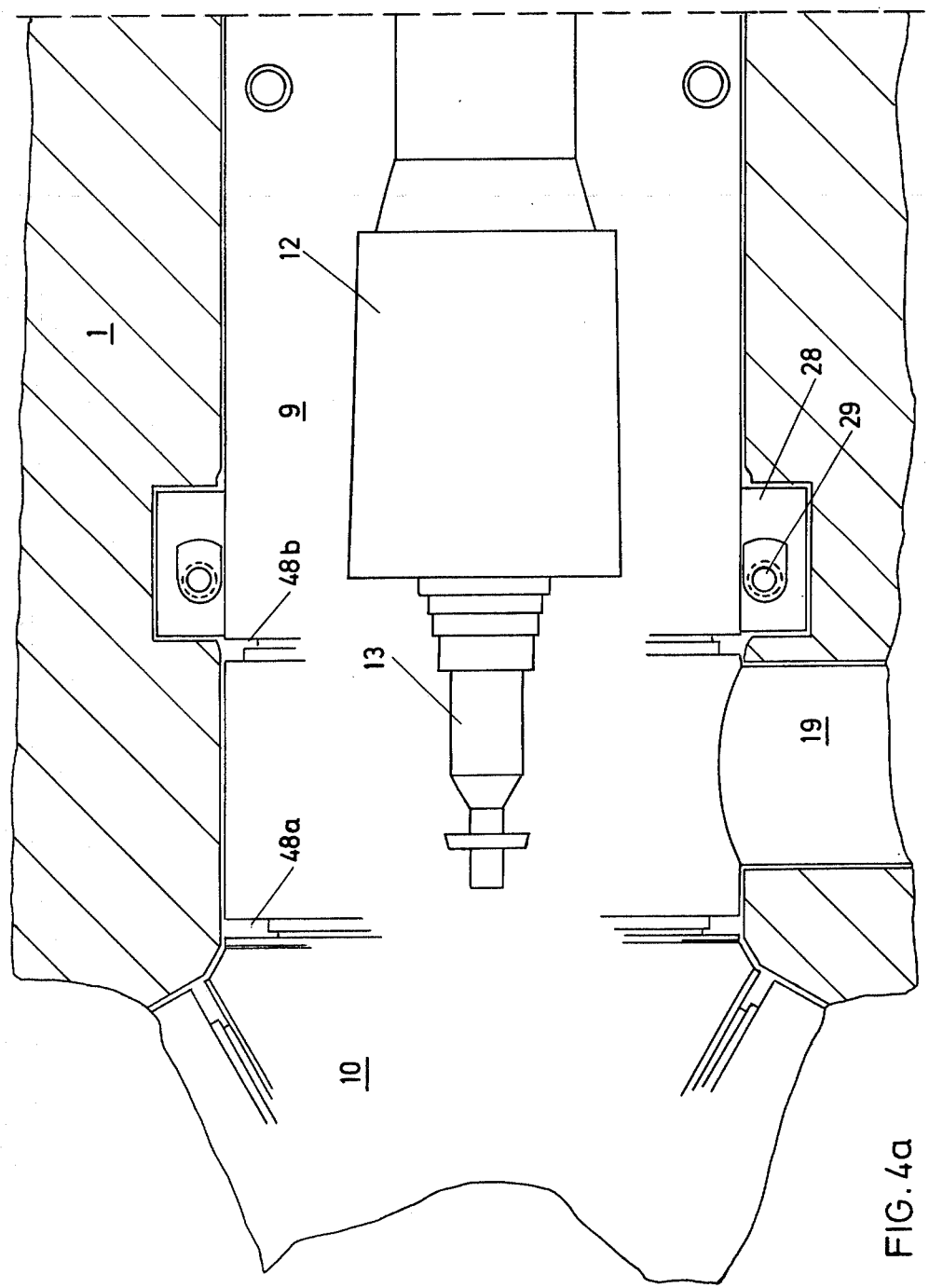
FIG. 4a and FIG. 4b are horizontal cross-sectional views taken through the turbine duct taken along the line IV—IV in FIG. 2.
Figure 4B:
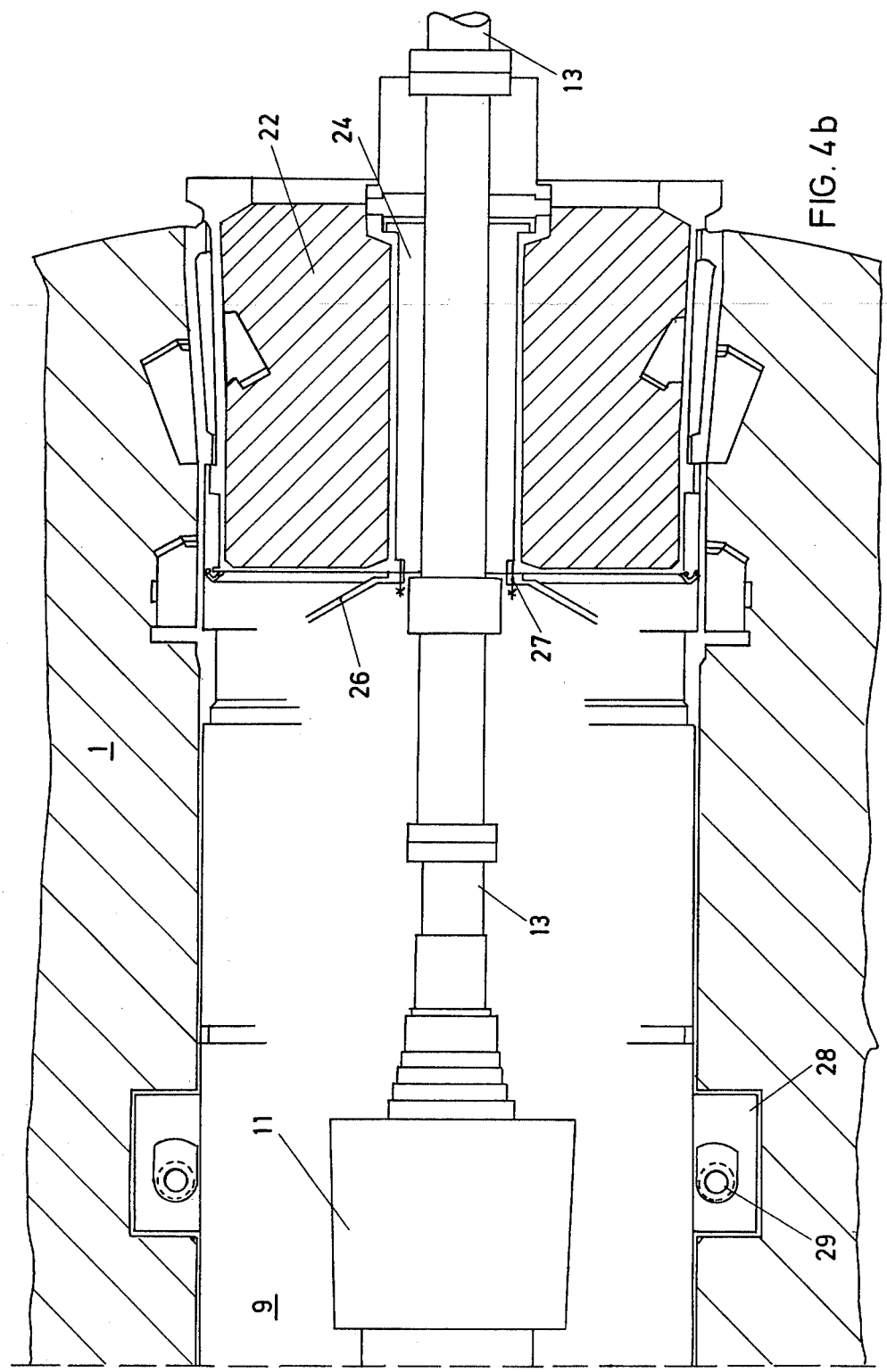

On another circular line around the axis of the pressure vessel, six vertical pods 16 are symmetrically arranged, in which the heat exchangers, i.e., recuperators and coolers (not shown), are situated. Two pods 16 are assigned to each of the three loops, one of each pair containing a recuperator and the other a cooler. Both of these pods are arranged symmetrically to one of the turbine ducts 9 and are connected in their upper part by a horizontal duct 17, serving as the gas line from the recuperator to the cooler of each loop. A further gas line 18 connects each turbine 11 with the recuperator of the same loop. The connection from the cooler to the compressor 12 of each loop is effected by a gas line 19, which is shown in the further figures (FIGS. 3a and 4a).

The cooled gas is at first led through the gas transport pods 14 from the compressors 12 to the recuperators of the three loops, whereby it passes along outside the hot gas lines 15, which are designed as coaxial gas lines. Then the gas flows in each case through a horizontal connecting line 20 into those pods 16, in which the recuperators are installed. The feedback of the reheated gas from the recuperators to the reactor inlet flanges 6, is effected in each case by means of a gas line 21, which at first extends upwardly at an incline and then is formed as a coaxial (inside) line in the vertical gas line pod 14 of the respective loop.

The coaxial gas lines and also all other recesses in the prestressed concrete vessel 1 are surrounded by gastight steel liners, provided with a thermal insulation and cooled by water. In the area of the coaxial gas lines in the vertical gas line pods 14, only slight loads of temperature arise at the liners, since hot gas streams are in each case surrounded by colder gas streams.

Figure 2A:
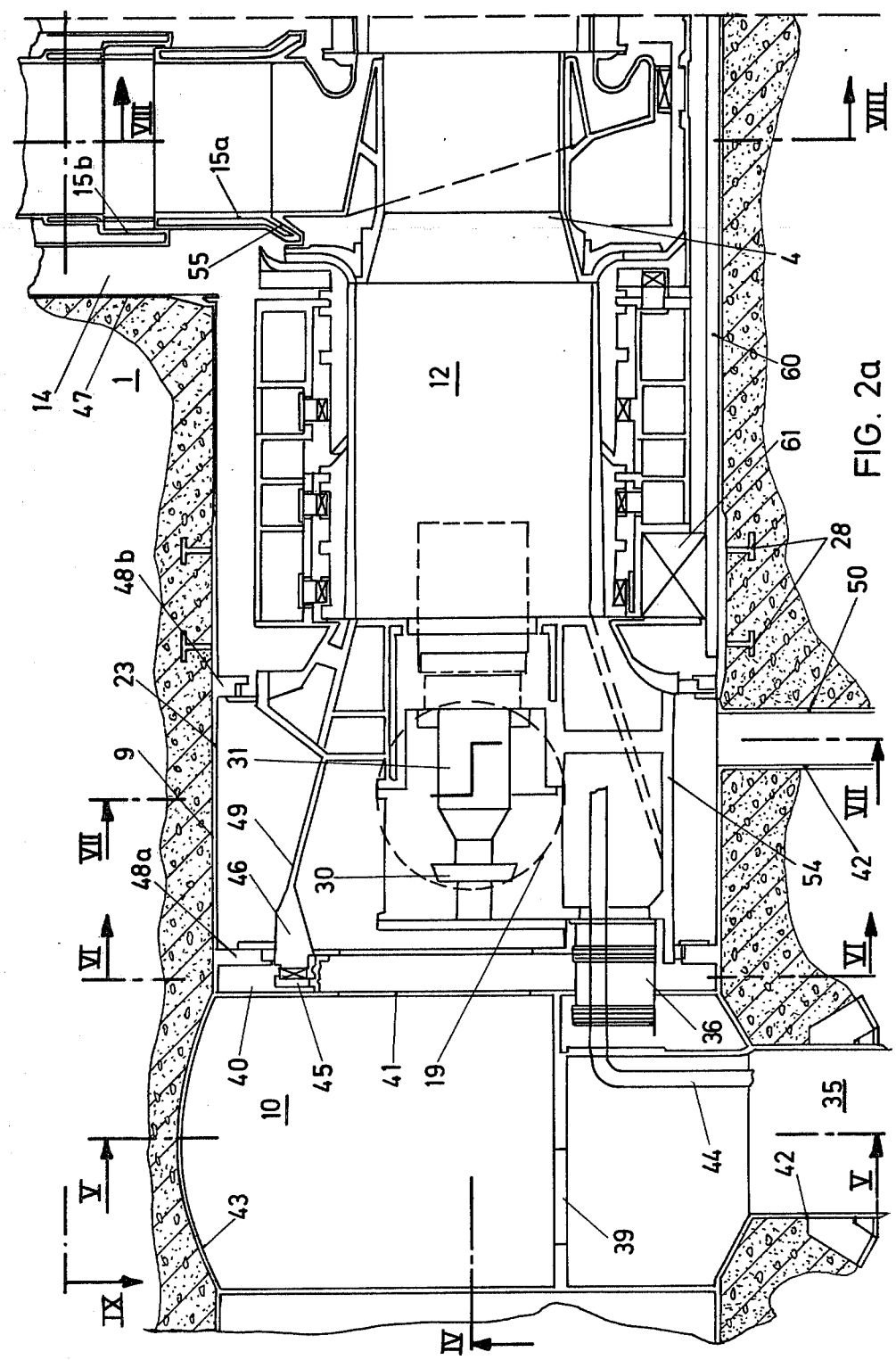
FIG. 2a and FIG. 2b are vertical cross-sectional views through one of the turbine ducts of the reactor plant along its longitudinal axis.
Figure 2B:
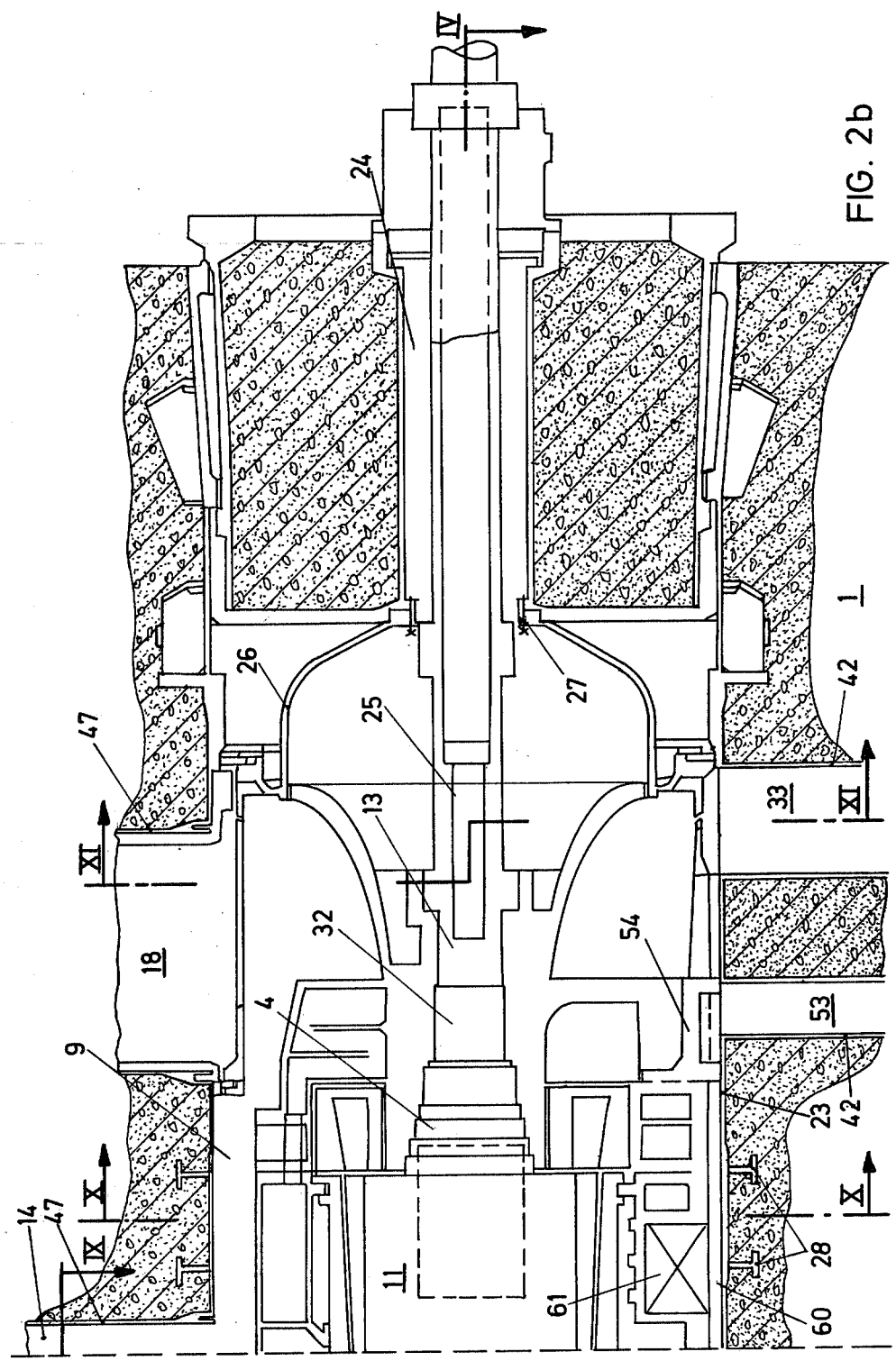

In FIGS. 2a and 2b there is shown in vertical section, one of the three turbine ducts 9 in a larger scale which, as already described, discharges into a central cavity 10. The outlet of the turbine duct 9 is closed by a prestressed concrete plug 22, and the total duct is coated by a metallic liner 23. In the turbine duct 9 one of the three gas turbo apparatuses 4 is arranged in such a manner that the turbine 11 with the shaft connection for the generator lies towards the outlet of the duct 9, while the compressor 12 is situated in the center of the prestressed concrete vessel 1. In the prestressed concrete plug 22, there is provided a shaft opening or bore 24, which connects the turbine 11 via an intermediate shaft 25 with the generator. An axial supporting cap 26, mounting at the prestressed concrete plug 22, serves for supporting the gas turbo apparatus 4; the place for mounting this supporting cap on the prestressed concrete plug 22 forms an axial fixed or anchor point 27 for the gas turbo apparatus 4.

Figure 10:
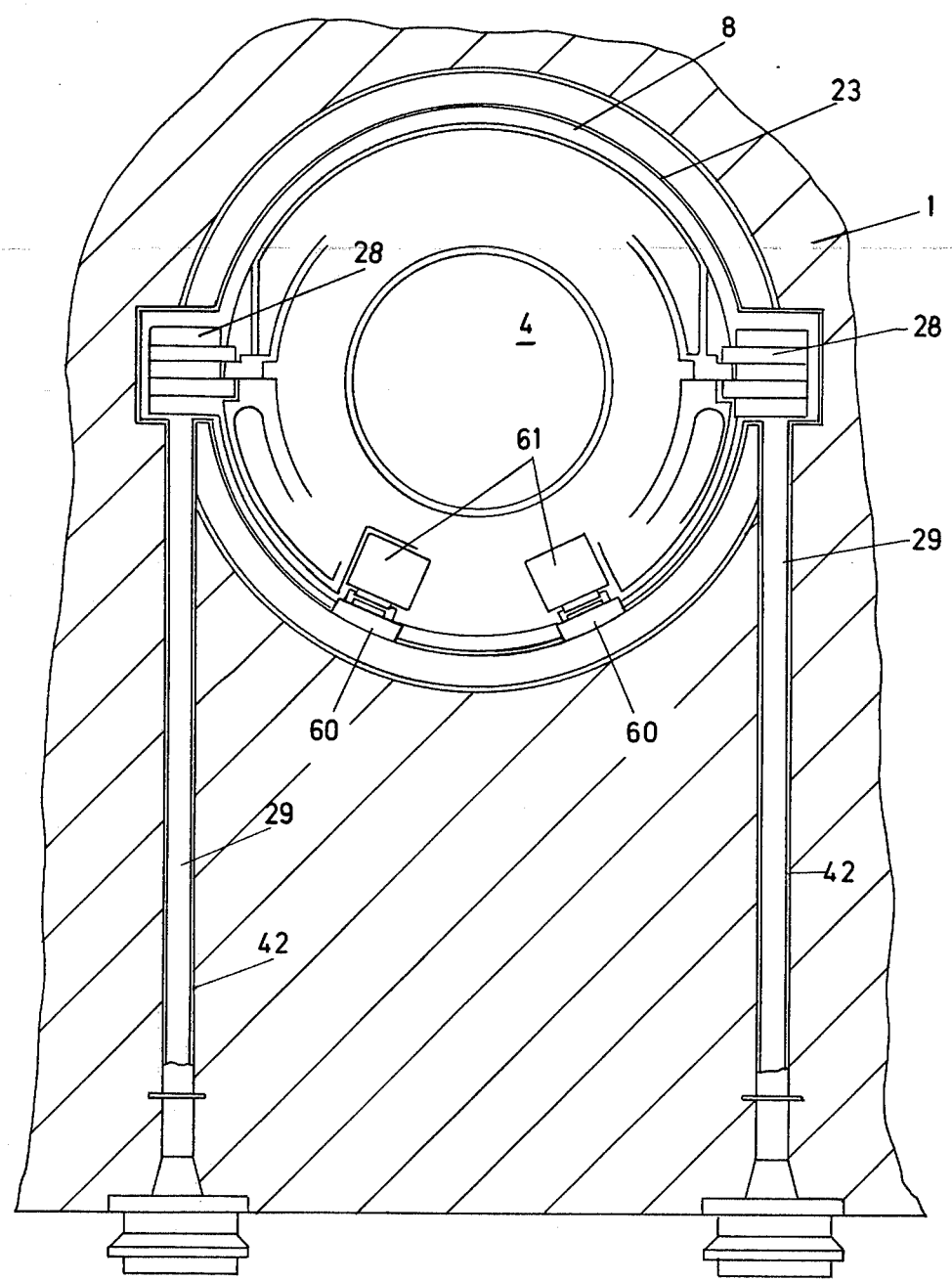
FIG. 10 is a vertical cross-sectional view taken along the line X—X in FIG. 2.

The total gas turbo apparatus 4 rests on two further supports 28, one of which carries the turbine 11 and the other the compressor 12. By means of these supports, the basic pressure of the gas turbo apparatus 4 is transferred to the prestressed concrete vessel 1. FIG. 10 shows a detailed representation of the support 28 at the side of the turbine. Both supports 28 are designed in such a manner that the gas turbo apparatus 4 can be loosened from its anchoring by means of remote control. The instruments, intended for this purpose, are operated hydraulically or mechanically from the outside, and for this purpose there are provided two bores 29 in the prestressed concrete vessel 1 for each support 28.

Figure 5:
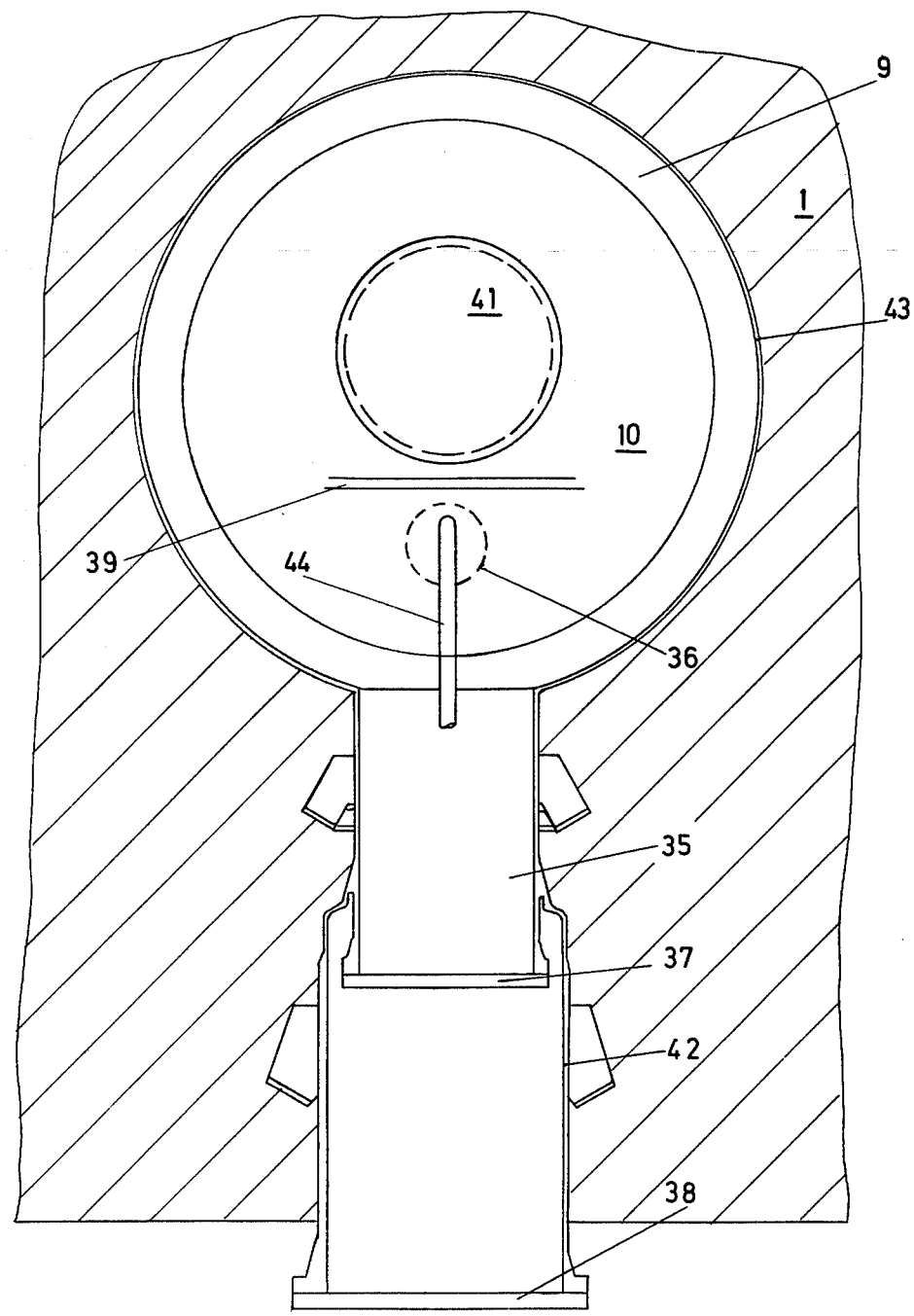
FIG. 5 is a vertical cross-sectional view taken along the line V—V in FIG. 2.
Figure 11:
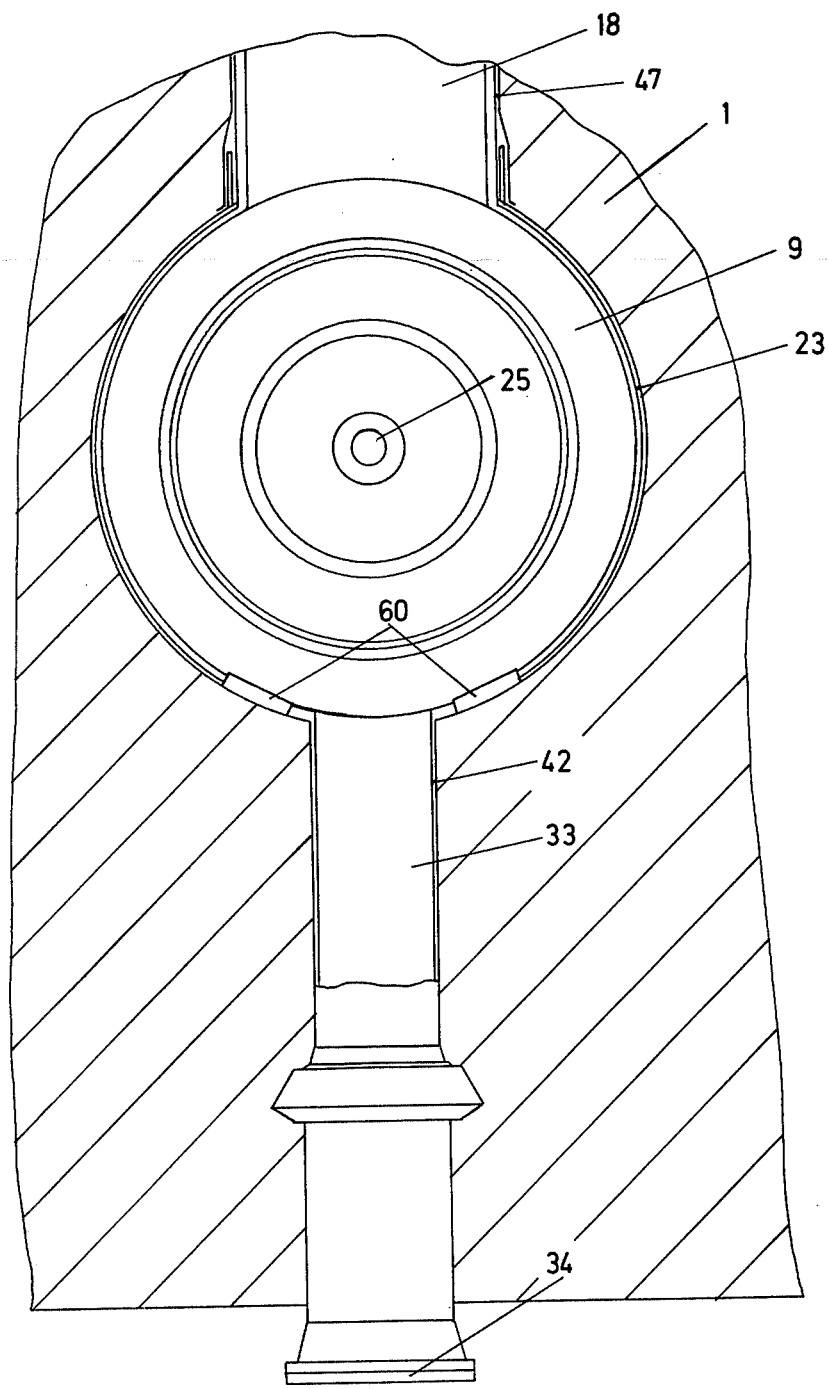
FIG. 11 is a vertical cross-sectional view taken along the line XI—XI in FIG. 2.

For mounting the gas turbo apparatus 4, an axial bearing 30 for the compressor 12 is arranged in the internal area of the turbine duct 9, which is, moreover, also supported by a radial bearing 31. A further bearing 32 is intended for the turbine 11. All bearings can be detached without requiring that the gas turbo apparatus must be first demounted. An access duct 33, closed by a cover plate 34, provides for the accessibility of the bearing 32 (also see FIG. 11). Both bearings 30 and 31 on the compressor 12 are passable through an access duct 35, which enters from the bottom edge of the prestressed concrete vessel in the central cavity 10, as well as through an inlet manhole 36. The access duct 35 is closed by two cover plates 37, 38 (see FIG. 5). In the central cavity 10 there exists an intermediate platform 39 for mounting and dismounting of the three gas turbo apparatuses 4 as well as the associated bearings. The inlet to the three turbine ducts 9 is closed in each case by a cover plate 40, in which there is an inlet opening 41, as well as the access to the inlet manhole 36. All access ducts are coated by metallic liners 42; likewise, the central cavity 10 has a liner coating 43.

Figure 6:
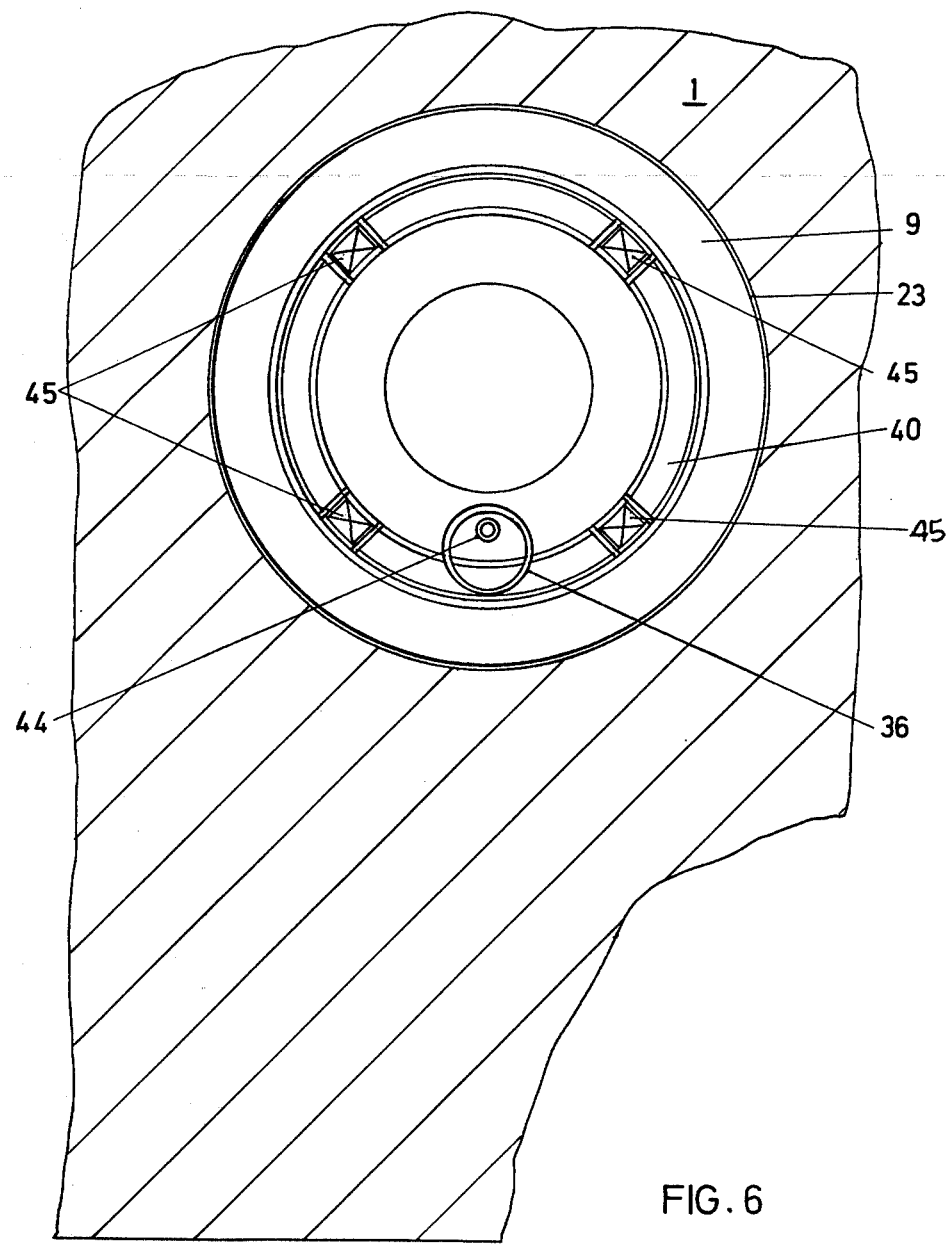
FIG. 6 is a vertical cross-sectional view taken along the line VI—VI in FIG. 2.
Figure 7:
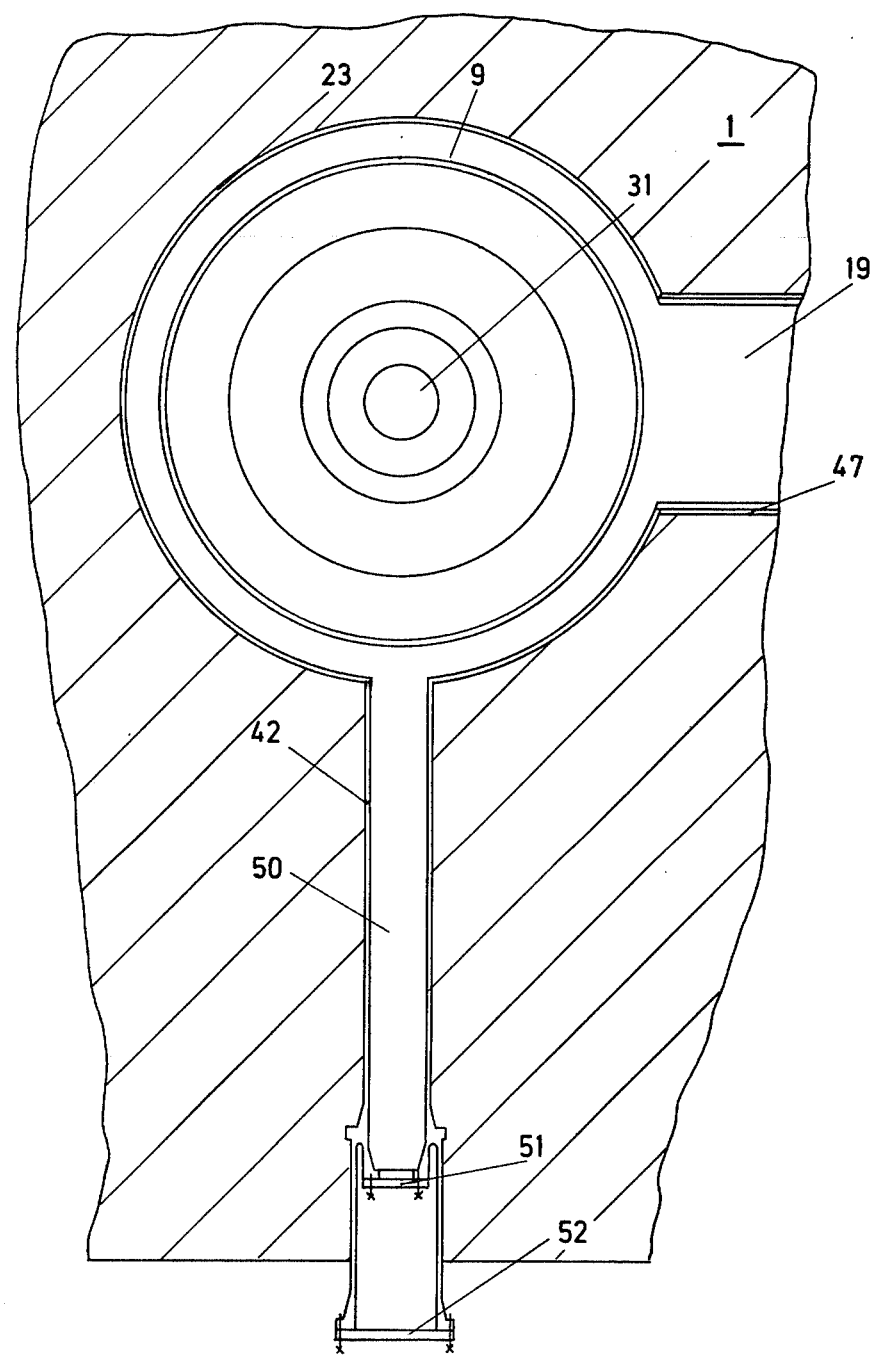
FIG. 7 is a vertical cross-sectional view taken along the line VII—VII in FIG. 2.

The lines necessary for the supply of the gas turbo apparatus 4, are led from the outside through the access duct 35 into the central cavity 10, from which they are transferred through the inlet manhole 36. The connections for the gas turbo apparatus 4 are arranged at the external bearing ends, so that they are accessible from the outside or can be separated. For example, in FIGS. 2a/b, 5 and 6 the supply line 44 is shown. In FIG. 6, illustrating a section through the cover plate 40, there is recognizable, furthermore, the radial attachment 45 of the housing 46 of the gas turbo apparatus 4, whereby at four points, staggered from each other by 90°, elements of the housing 46 and of the cover plate 40 are engaged with each other.

As the FIGS. 3a/b, 4a/b and 7 illustrate, the gas line 19 coming from the cooler enters the turbine duct 9 approximately at the level of the bearings 30, 31 and also the compressor. The liner 47 of the gas line 19 is directly connected with the liner 23 of the turbine duct 9, i.e., both with this gas line, as well as with all further gas lines entering the turbine duct 9, no flange connections at the housing 46 of the gas turbo apparatus are provided. As a further example of this, there are mentioned also the gas line 18 in which the turbine exhaust gas passes to the recuperator (see FIGS. 2a/b and 11) and the gas line pod 14, in which the cold recompressed gas passes from the compressor 12 to the recuperator, coaxially to the hot gas line 15 (see FIGS. 2a/b and 8). Also here, their liners 47 are directly connected to the liner 23 of the turbine duct 9.

The separation of the individual gas streams in the turbine duct 9 from each other is effected by means of peripheral seals 48, arranged between the apparatus housing 46 and the liner 23 of the turbine duct 9, which are designed as plug seals, so that they do not hinder the dismounting of the gas turbo apparatus 4. On the apparatus housing there is in each case a sealing flange, while the plugable part of the seals 48 is provided at the liner 23. In FIGS. 2a/b, the peripheral seals for the sealing of the gas streams leaving the gas lines 18 and 19 are shown. The peripheral seal 48a which faces the central cavity 10 at the gas line 19 is designed as cold gas low-pressure seal, while the other seal 48b in the area of this gas line is designed as a cold gas high-pressure seal, since it effects sealing of the compressor inlet from the compressor outlet. FIG. 2a/b shows furthermore the shaping of the turbo apparatus housing 46 in this area; in order to transfer the resulting wedge shearing forces to the liner 23, the turbo apparatus housing 45 includes a number of ribs 49. The cold gas low-pressure seal 48a is accessible through the inlet opening 41 in the cover plate 40 from the outside of the prestressed concrete vessel 1.

As is shown in FIGS. 2a/b and 7, in the prestressed concrete vessel 1, there is provided a manhole 50, which opens from the bottom into the area of the compressor inlet in the turbine duct 9. Also this manhole is closed by two cover plates 51, 52 and coated by a liner 42. In the area of the turbine outlet, a manhole 53, designed in the same manner, opens into the turbine duct 9 and is also provided with cover plates (not shown) and a liner 42. Both manholes 50 and 53 represent bores for lifting and centering devices which are operated hydraulically and which serve to make possible a remote controlled mounting and dismounting of the gas turbo apparatus 4. In the turbine duct 9, there is provided in each case a support 54 for one of the lifting and centering devices, in the area of the inlet points of both manholes 50 and 53.

Figure 8:
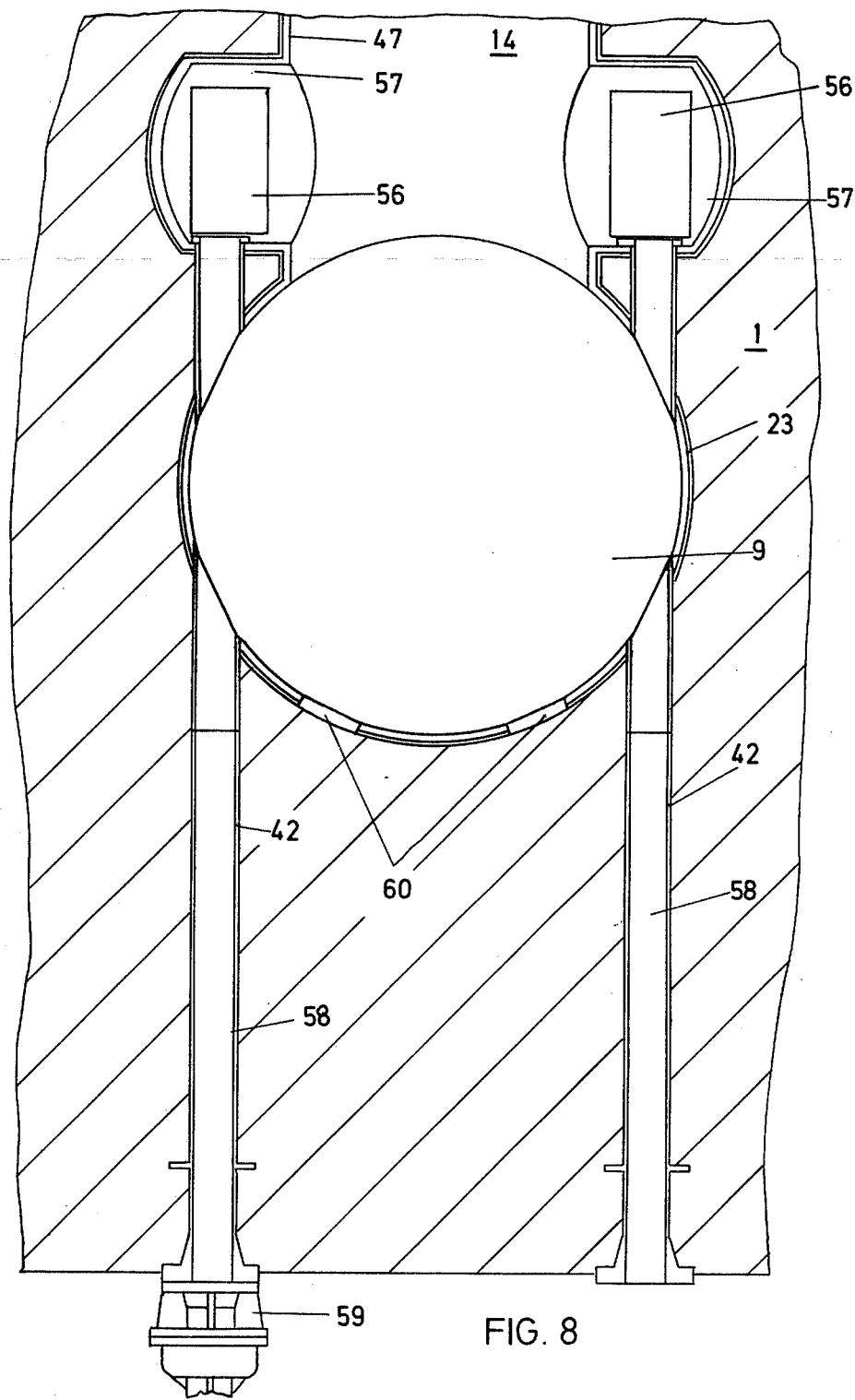
FIG. 8 is a vertical cross-sectional view taken along the line VIII—VIII in FIG. 2.
Figure 9:
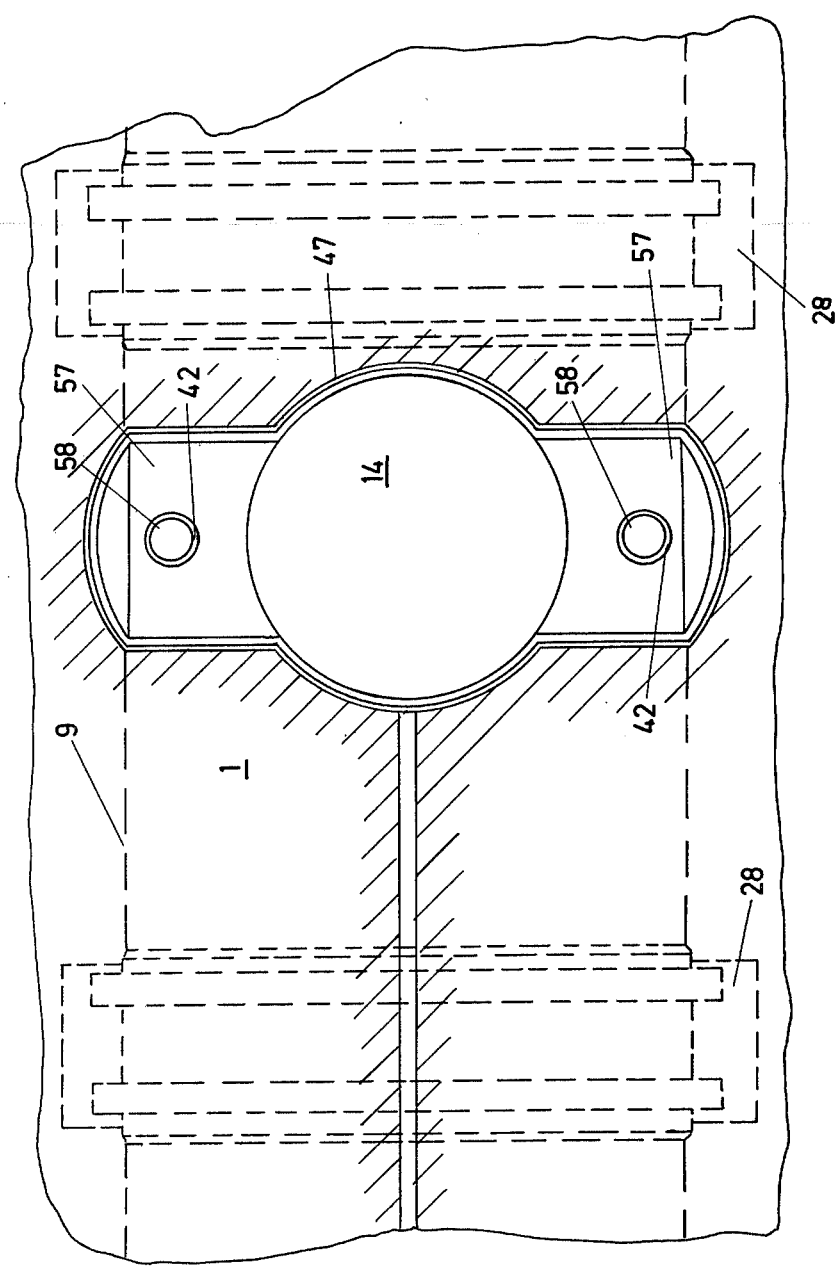
FIG. 9 is a horizontal cross-sectional view taken along the line IX—IX in FIG. 2.

As already described in FIG. 1 and also in FIGS. 2a/b, the hot gas line 15, which is located in the gas line pod 14, enters above the turbine 11 in the turbine duct 9. The connection of the hot gas line 15 to the turbine inlet flange is designed as plug connection 55, so that the both parts can be easily separated from each other. The hot gas line 15 is slidably designed in its lower area in such a manner that a lower part 15a can be inserted telescopically into an upper part 15b. In this manner, the hot gas line 15 can be withdrawn from the turbine duct 9, so that the total cross section of the duct is available for the mounting and dismounting of the gas turbo apparatus 4. The sliding of the hot gas line 15 is effected by means of two lifting systems 56 (FIG. 8), which work independently of each other and which are installed in two small cavities 57 above the turbine duct 9. The exact position of the lifting system 56 can be seen in FIGS. 8 and 9. The operation of the lifting system 56 is effected from the outside by means of two bores 58 provided in the prestressed concrete vessel 1. One of the driving systems 59 provided for that purpose is partially shown in FIG. 8. The turbine duct 9 is provided over the largest part of its length with guide rails 60, running parallel to each other in the bottom area, as it can be seen in FIGS. 8, 10 and 11. Four roller chassis 61, of which in each case two belong together and which form a front and a rear rolling system, are attached to the gas turbo apparatus 4. With the aid of these the gas turbo apparatus 4 can be inserted into the turbine duct 9. The front pair of the roller chassis is situated in the area of the compressor 12.

What is claimed is:

1. A nuclear reactor plant, comprising:
a prestressed concrete pressure vessel;
a high temperature reactor arranged in a first central cavity within said vessel;
a closed gas cooling circuit including at least one housed gas turbo unit arranged in a turbine duct in the wall of said vessel, said unit including a turbine and a compressor and having detachable bearings; means for exchanging heat and means for transporting gas in said cooling circuit including hot gas from said reactor to said turbine, said heat exchange means and said gas transport means being arranged in recesses in the wall of said vessel;
means for forming a detachable plug-in type connection between said hot gas transport means and each said turbo unit;
means, positioned at the edge of the turbine duct, for connecting all remaining gas transport means to said turbo unit;
means, including peripheral sealing members positioned between the inside wall of the turbine duct and the outer housing of said turbo unit, for separating each of said remaining gas transport means from each other;
means for detachably connecting each said turbo unit to the inside of its turbine duct;
remote control means for detaching said connecting means;
means, including at least one lifting device controllable from outside of said vessel through a bore in the wall of said vessel, for dismounting each said turbo unit from within its turbine duct;
means for detaching from outside of said vessel all connections to each said turbo unit which must be removed in order for removal of said turbo unit from its turbine duct; and
means, including a duct through the wall of said vessel, for gaining access to each bearing of each turbo unit.

2. The nuclear reactor plant as defined by claim 1, wherein said plug-in type connection means comprises a hot gas conduit having a telescoping portion adjacent said turbine and means for operating said telescoping portion by remote control.

3. The nuclear reactor plant as defined by claim 1, wherein said closed gas cooling circuit comprises a plurality of identical loops, each loop comprising a gas turbo unit, heat exchange means and gas transport means, and wherein the turbine ducts for each of said gas turbo units are arranged below the reactor cavity in a horizontal plane and are arranged symetrically to the vertical center axis of the said vessel.

4. The nuclear reactor plant as defined by claim 3, wherein said turbine ducts are arranged radially.

5. The nuclear reactor plant as defined by claim 4, wherein said turbine ducts extend up to the vertical center axis of said vessel and are closed at the opposite outlet end by a prestressed concrete plug.

6. The nuclear reactor plant as defined by claim 5, wherein each turbo unit is arranged in its turbine duct with the turbine adjacent the outlet end of the duct and the compressor toward the center of said vessel, and wherein each compressor is supported by an axial bearing located in said turbine duct.

7. The nuclear reactor plant as defined by claim 5, wherein said concrete plug includes a bore for accepting a shaft, whereby the turbine can be connected to a generator located outside the concrete vessel.

8. The nuclear reactor plant as defined by claim 5, further comprising means positioned inside of each turbine duct for supporting said turbo unit and means located on said concrete plug for anchoring each turbo unit.

9. The nuclear reactor plant as defined by claim 1, wherein all supply lines for each turbo unit are contained within said turbo unit and comprise connecting means at the edge of the turbo unit.

10. The nuclear reactor plant as defined by claim 5, wherein said vessel includes a second central cavity located at the junction point of said turbine ducts, an access duct passing through the wall of said vessel into said second central cavity, and a pair of spaced cover plates covering said access duct.

11. The nuclear reactor plant as defined by claim 10, wherein all of said supply lines lead from said turbo unit through said second central cavity and through said access duct.

12. The nuclear reactor plant as defined by claim 1, wherein the inside of the turbo unit housing and the space around it are pressurized to the same pressure.

13. The nuclear reactor plant as defined by claim 1, further comprising rails positioned in each turbine duct and at least on roller chassis attached to each turbo unit, whereby the turbo unit is adapted to run along the rails on said chassis.

* * * * *